United States Patent
Johnson et al.

[19]

[11] Patent Number: 5,936,798
[45] Date of Patent: Aug. 10, 1999

[54] COVER FOR A DISK DRIVE ASSEMBLY

[75] Inventors: Paul Johnson, Kaysville; David E. Jones, Layton, both of Utah

[73] Assignee: Iomega Corporation, Roy, Utah

[21] Appl. No.: 08/881,808

[22] Filed: May 30, 1997

[51] Int. Cl.$^6$ .................................................. G11B 17/02
[52] U.S. Cl. .......................................................... 360/97.01
[58] Field of Search ............................. 360/97.01–99.12, 360/106

[56] References Cited

U.S. PATENT DOCUMENTS

| | | | |
|---|---|---|---|
| 4,504,879 | 3/1985 | Toldi et al. | 360/105 |
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 5,027,241 | 6/1991 | Hatch et al. | 360/105 |
| 5,111,350 | 5/1992 | Carey et al. | 360/97.01 |
| 5,214,549 | 5/1993 | Baker et al. | 360/97.02 |
| 5,282,100 | 1/1994 | Tacklind et al. | 360/97.02 |
| 5,291,359 | 3/1994 | Wolter | 360/104 |
| 5,430,589 | 7/1995 | Moir et al. | 360/97.02 |
| 5,453,890 | 9/1995 | Takegami et al. | 360/97.02 |
| 5,508,864 | 4/1996 | Briggs et al. | 360/106 |
| 5,530,607 | 6/1996 | Spendlove | 360/105 |
| 5,825,585 | 10/1998 | Hatam-Tabrizi | 360/97.02 |

FOREIGN PATENT DOCUMENTS 0 739 013 A1  10/1996  European Pat. Off. .

*Primary Examiner*—Robert S. Tupper
*Attorney, Agent, or Firm*—Woodcock Washburn Kurtz Mackiewicz & Norris LLP

[57] ABSTRACT

A cover for a disk drive is provided. The cover comprises a body portion having a relative upper surface and relative inner surface. The upper surface defines a plurality of depressions and a window opening. The inner surface is adapted to be welded to a disk drive.

9 Claims, 4 Drawing Sheets

COVER FOR A DISK DRIVE ASSEMBLY

RELATED APPLICATIONS

The present application is related to the following patent applications all of which are hereby incorporated by reference in their entirety:

Ser. No. 08/866,189, filed on May 30, 1997, entitled "An Improved Operating System For Operating An Eject System And A Head Retraction System Of A Disk Drive" (Attorney Docket No. IOM-9460); Ser. No. 08/881,804, filed on May 30, 1997, entitled "Media Capture to Prevent Head Damage In A Removable Cartridge Disk Drive" (Attorney Docket No. IOM-9463); Ser. No. 08/866,225, filed on May 30, 1997, entitled "An Improved Head Retraction System for Retracting The Heads Of A Disk Drive" (Attorney Docket No. IOM-9464); Ser. No. 08/881,803, filed on May 30, 1997, entitled "Steering Magnets To Reduce Magnetic Leakage Flux In A Disk Drive" (Attorney Docket No. IOM-9507); Ser. No. 08/881,805, filed on May 30, 1997, entitled "Laminated Steel Return Path With Actuator Support Features" (Attorney Docket No. IOM-9508); Ser. No. 08/866,190, filed on May 30, 1997, entitled "Dual Loop Flex Circuit For A Linear Actuator" (Attorney Docket No. IOM-9509); Ser. No. 08/872,712, filed on May 30, 1997, entitled "Interlocking Carriage Assembly For Linear Actuator" (Attorney Docket No. IOM-9511); Ser. No. 08/881,806, filed on May 30, 1997, entitled "Head Gimbal Protection For A Disk Drive" (Attorney Docket No. IOM-9512); Ser. No. 08/866,168, filed on May 30, 1997, entitled "Flexured Mounting System For Friction Reduction And Friction Linearization In Linear Actuator For Disk Drive" (Attorney Docket No. IOM-9514); Ser. No. 08/881,807, filed on May 30, 1997, entitled "Return Path Geometry to Enhance Uniformity Of Force On A Linear Actuator" (Attorney Docket No. IOM-9516); Ser. No. 08/860,180, filed on May 30, 1997, entitled "In-Rigger For A Linear Actuator Carriage Assembly" (Attorney Docket No. IOM-9517); Ser. No. 08/866,171, filed on May 30, 1997, entitled "Integral Lift Wing For A Disk Drive Actuator" (Attorney Docket No. IOM-9518); Ser. No. 08/866,227, filed on May 30, 1997, entitled "Head Protection In A Disk Drive" (Attorney Docket No. IOM-9519); Ser. No. 08/866,167, filed on May 30, 1997, entitled "Self-Positioning Lever For Opening The Shutter Of A Removable Disk Cartridge" (Attorney Docket No. IOM-9525); Ser. No. 08/866,177, filed on May 30, 1997, entitled "Motor Loading System For A Disk Drive" (Attorney Docket No. IOM-9526); Ser. No. 08/866,226, filed on May 30, 1997, entitled "An Improved Eject System For Ejecting A Disk Cartridge From A Disk Drive" (Attorney Docket No. IOM-9527).

BACKGROUND OF THE INVENTION

1. Field of the Invention

The present invention is related to linear actuators for carrying read/write heads into engagement with a recording medium, and, more particularly, to a cover for the same.

2. Description of the Prior Art

Disk drives for storing electronic information are found in a wide variety of computer systems, including workstations, personal computers, and laptop and notebook computers. Such disk drives can be stand-alone units that are connected to a computer system by cable, or they can be internal units that occupy a slot, or bay, in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type that accept removable disk cartridges have become increasingly popular. FIG. 1 shows one disk drive product, known as the ZIP™ drive, that has been very successful. This disk drive is designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems.

FIGS. 1 shows a prior art disk drive and cover 42 attached to the chassis. Conventional covers are made of typically made of a plastic or metal material. One drawback with employing a cover made of a plastic material with a disk drive is that the disk drive is relatively weak. It would, therefore, be desirable to provide a cover for a disk drive with improved strength.

Prior art disk drives typically have separate spring members welded or otherwise attached to the inner surface of the cover. These spring members are provided for biasing or pressing an inserted cartridge into an operating position. One drawback with having a separate spring member is that an additional component must be accounted for and separately attached to the cover. Another drawback is that the spring must be attached within certain tolerances which may be difficult to obtain. It would therefore be desirable to provide a means for positioning a cartridge without these drawbacks.

In the past, covers were attached to the chassis with adhesives or snap fits. One of the drawbacks with employing adhesives and snap fits to attach the cover to the chassis was that the cover was likely to slip under load conditions and, thereby, damage or misalign the internal components of the disk drive. To overcome this problem, fastening members such as screws were employed to perform the same function. The application of fastening members, however, created other problems. One of these problems was the fastening members could not maintain the desired rigidity of the cover because of the clearance required for the screw and therefore allow for cover and chassis slippage. It would therefore be desirable to provide a cover for a disk drive that maintains its rigidity after the cover is fastened to the disk drive.

SUMMARY OF THE INVENTION

In accordance with the present invention, a cover for a disk drive is provided. The cover comprises a body portion having a relative upper surface and relative inner surface. The upper surface defines a plurality of depressions and a window opening. The inner surface is adapted to be welded to a disk drive.

DETAILED DESCRIPTION OF THE PREFERRED EMBODIMENTS

Figure 1:
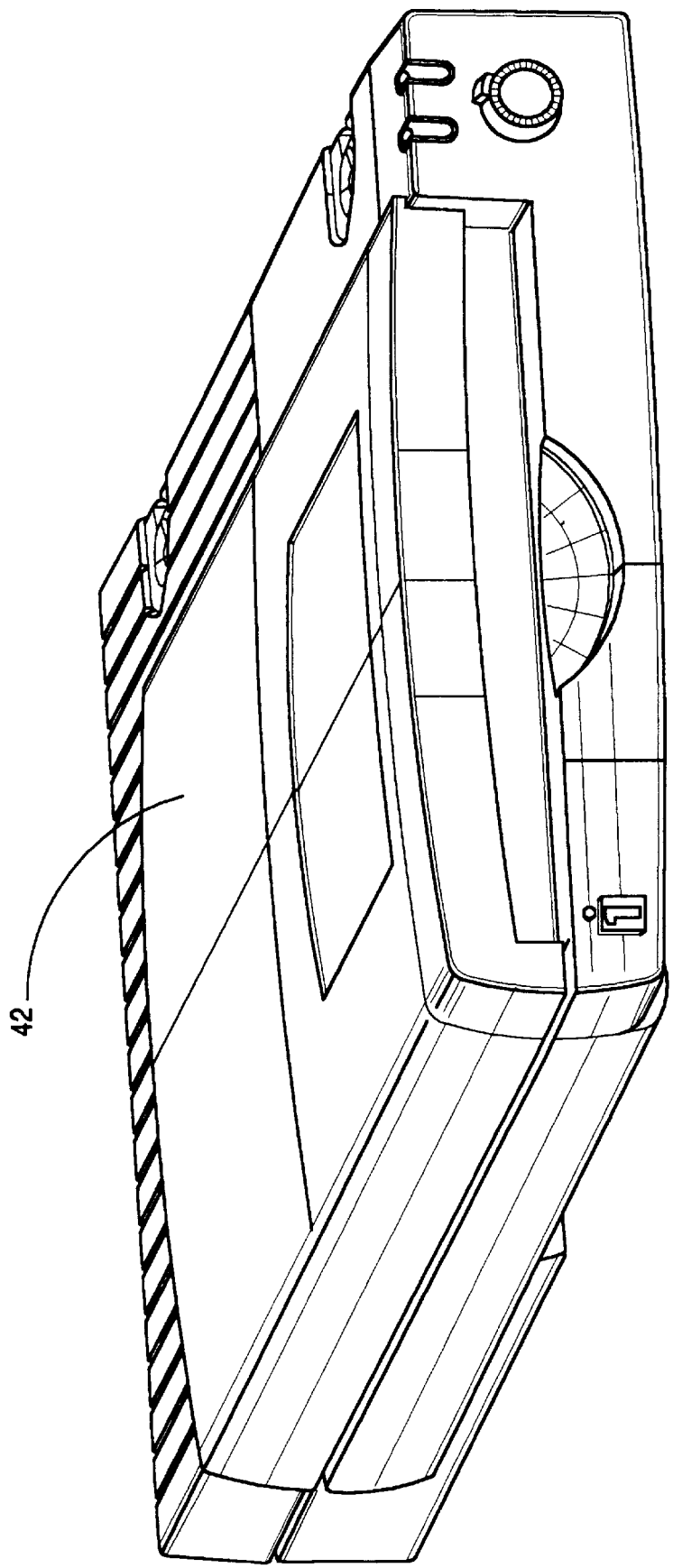
FIG. 1 is a perspective view of a prior disk drive assembly.
Figure 2:
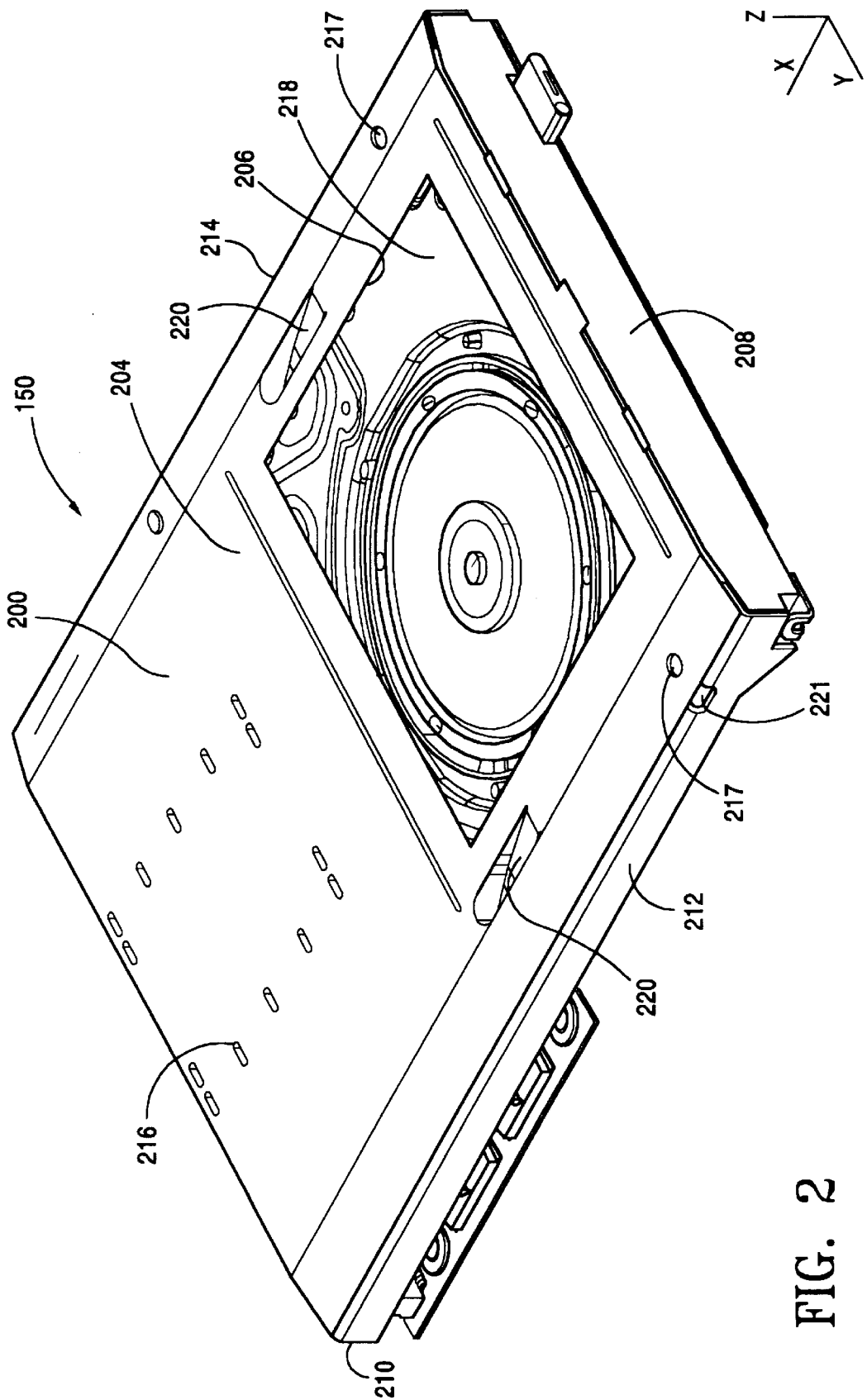
FIG. 2 is a perpective view of a disk drive that incorporates a cover in accordance with the present invention.
Figure 2A:
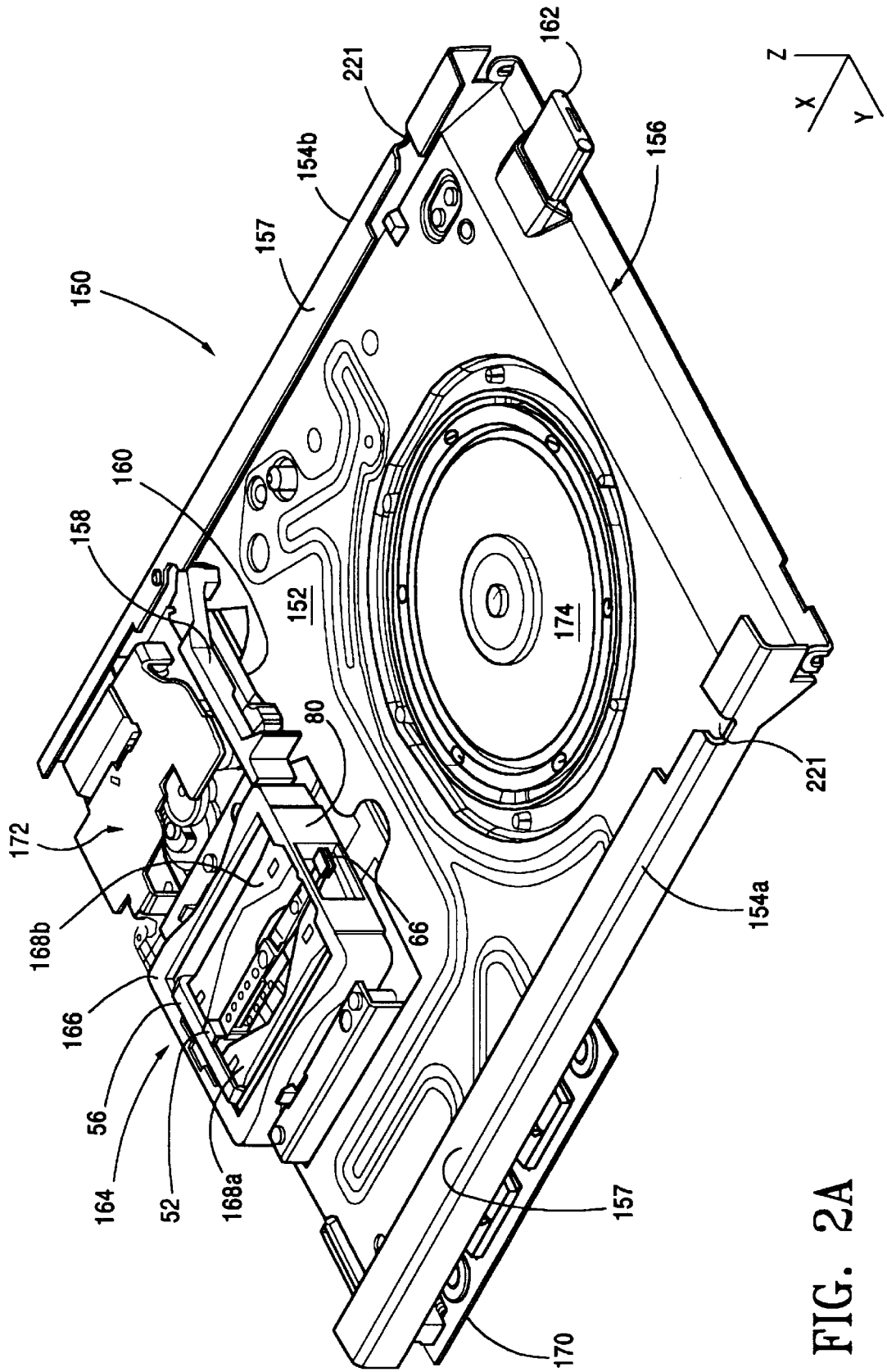
FIG. 2A is a view of the disk drive shown in FIG. 2 without the cover mounted thereon.

FIGS. 2 and 2A illustrates an exemplary disk drive 150 in which the cover 200 may be employed. FIG. 2A shows the cover for the disk drive 150 with the cover removed so that the internal components of the drive are visible. The disk drive 150 comprises a chassis 152 having u-shaped outer edges that form opposed guide rails 154a, 154b that guide a removable disk cartridge (not shown) into the disk drive through opening 156. The chassis 152 also defines two cover attaching members 157. In the present embodiment, the chassis is metallic.

A cartridge shutter lever 158 and an eject lever 160 are rotatably mounted on the chassis. Both levers 158 and 160 are shown in the positions that they occupy when a disk cartridge is fully inserted into the drive. During cartridge insertion, the shutter lever swings from a forward position to the position. During this movement, an abutment surface on the shutter lever 158 engages a shutter of the disk cartridge and moves the shutter to the side, exposing a head access opening in the front peripheral edge of the cartridge. The eject lever also moves from a forward position to the position shown when the cartridge is inserted. In this position, the eject lever is in a cocked position, under spring tension. When it is desired to eject the disk cartridge from the drive 150, an eject button 162 is pushed. Among other things, this causes the eject lever 160 to be released from its cocked position, so that it springs forward to force the disk cartridge backwardly out of the disk drive.

The disk drive 150 also has a linear actuator 164 disposed at the rear of the chassis 152. The linear actuator 164 comprises a magnetic motor including the coil 56 mounted on a carriage assembly 52 an outer magnet return path assembly 166, and two inner return paths 168a, 168b on opposite sides of the carriage assembly 52 in sliding communication with the coil 56 and in-rigger 80. After a disk cartridge is inserted into the disk drive 150, the carriage assembly 52 carries a pair of read/write heads 66 over the recording surfaces of a disk-shaped storage medium within the cartridge.

A spindle motor 174 is provided on the floor of the chassis 152. During cartridge insertion, the spindle motor 174 is translated vertically into engagement with a hub of the disk cartridge, in order to rotate the disk-shaped storage medium at a relatively high speed. A circuit board 170 is attached to the chassis 152 via a plurality of standoffs (not shown). The circuit board 170 carries the drive circuitry. A gear train mechanism 172 controls movement of the eject lever 160 and movement of a head retract mechanism (not shown) that moves the carriage assembly 52 to a parked position to prevent damage to the read/write heads 66, when the disk drive is not in use. The in-riggers 80 maintain the carriage assembly 52 in the desired operating position as the carriage assembly 52 moves from the parked position to the operating position and vice versa by pressing a pushing on the inner return path 168a to prevent the coil 56 from hitting the cover 200.

The cover 200 is made of a relatively thin metal plate 202 having a relative outer surface 204 and relative inner surface 206. The preferred material is 0.2 mm 304 series ½ hard stainless steel. Preferably, the metal plate has a relative short front end 208 and a relative short rear end 210 with two opposing relatively long ends 212 and 214 extending therebetween. The relative inner surface is adapted to be welded to the chassis cover attaching members 157. The methods of welding the cover 200 are discussed in more detail below.

The cover 200 defines two opposing spring fingers 220 integrally formed proximate the two long edges 212 and 214. The spring fingers are adapted to bias against the cartridge to press the cartridge into an operating position. The spring fingers are discussed in more detail below.

The cover 200 also comprises a plurality of relatively inwardly extending depressions 216 formed therein. The depressions 216 are formed and positioned on the cover such that the depression cooperate with the outer return path 166 when a force is applied to the cover, thereby, preventing the cover from contacting the voice coil 56 and other internal components.

The cover also defines inwardly projecting filler wells 217 which are adapted to fill bend holes 221 formed along the chassis to prevent the cartridge from jamming within the bend holes 221. The filler wells 217 are formed to enable the chassis front end to be bent so the shutter can be mounted. The bend holes are formed and positioned such that when the cover is mounted to the chassis, the wells mate with the bend holes.

The metal plate 202 defines an opening 218 proximate the front end 208. Preferably, the opening 218 begins substantially proximate the front end 208 and extends towards the rear end 210 and proximate the two long ends 212 and 214. Preferably, the opening is adapted to expose the cartridge contained within the disk drive such that any indicia on the cartridge or other information can be viewed. It is noted that a window (not shown) can be positioned in relation to the opening 218 to prevent unwanted objects from contacting the internal disk drive components.

The cover is attached to the disk drive. Specifically, the cover inner surface 206 is welded to the chassis cover attaching members 157. Preferably, the cover is spot welded using methods known by those with ordinary skill in the art. Other method include seam welding and laser welding. The welds are made at locations wherein the internal components can not be damage by the welding process.

One of the advantages of the cover in accordance with the present invention is that high risk failure components can be placed through the bottom of the disk drive and attached to the chassis and reworked or manipulated after the cover is welded to the chassis. Such high risk failure components include the entire linear actuator assembly, including the read/write heads, carriage arms, coil, carriage arms, and motor. It is noted that low risk failure components are positioned within the chassis before the cover is welded thereto. Such low risk failure components include the shutter and outer motor ring.

Figure 3:
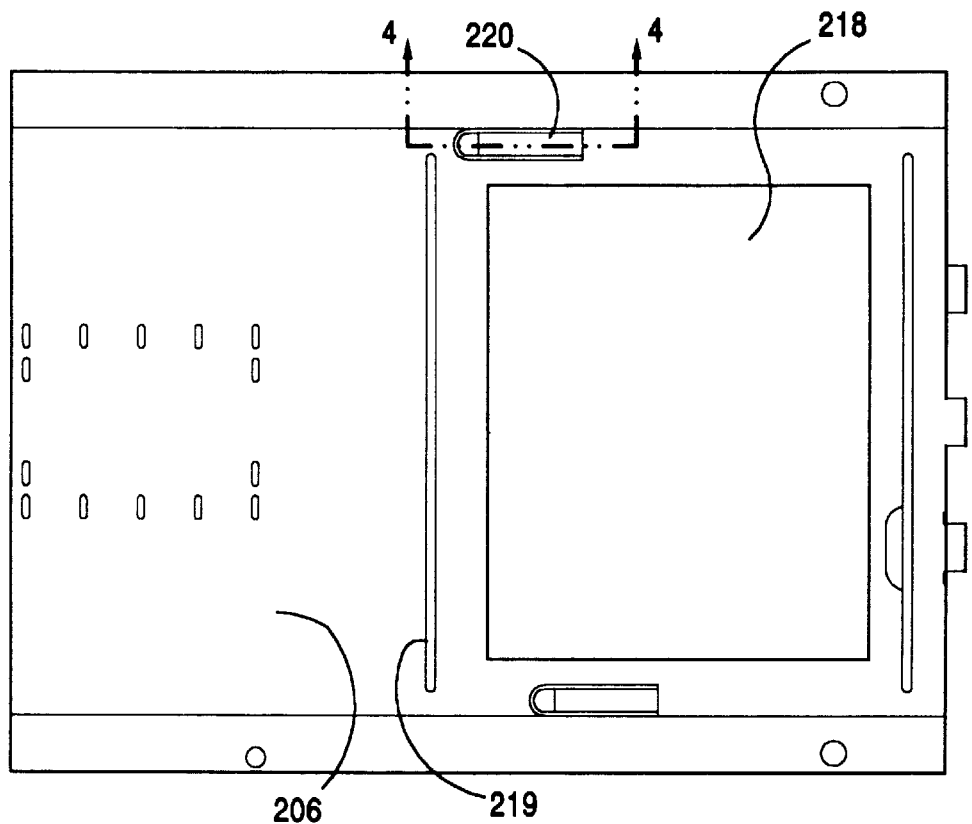
FIG. 3 is a bottom view of the cover illustrating the cover inner surface.
Figure 4:
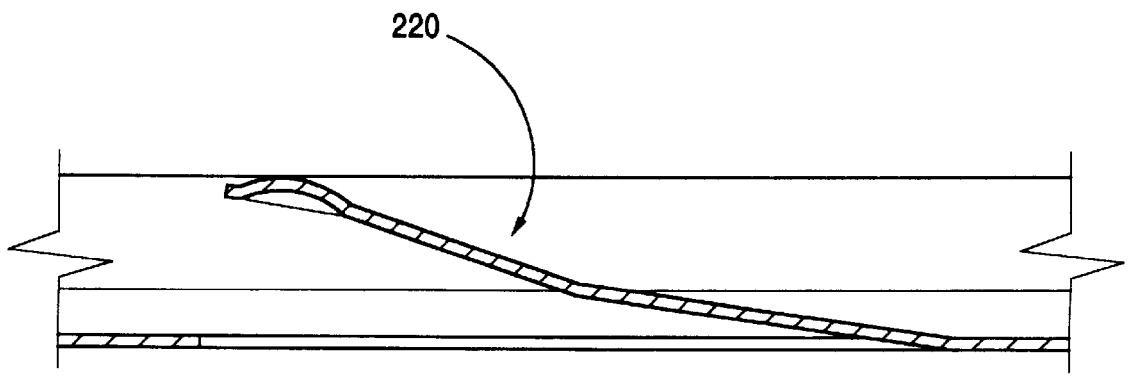
FIG. 4 is a sectional view taken along line 4—4 in FIG. 3.

FIG. 3 shows the inner surface 206 of the cover in more detail. At least one rib 219 is provided to support a window adjacent to the opening 218 such that the window does not bow inwardly and contact objects maintained within the disk drive.

A pair of spring fingers 220 are shown integrally formed at opposite sides of the cover. The spring fingers are generally inwardly cantilevered having a fixed end and a free end that is adapted to bias a cartridge into an operating position. The cover is made of a material that enables the spring finger to operate in this manner. FIG. 3A shows the spring finger in more detail.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A cover for a disk drive, said cover comprising:

a body portion, said body portion having a relative upper surface and a relative inner surface;

a plurality of depressions, extending from the upper surface and below the inner surface, the plurality of depressions being disposed so that they are disposed over an outer return path of the disk drive when the cover is attached to the disk drive and so that if the cover is pushed upon when attached to the disk drive the depressions will contact the outer return path and thereby prevent the cover from contacting an actuator that has a pair of read/write heads; and a window opening, disposed in the body portion.

2. The cover in claim 1 wherein said cover is made of a metal material.

3. The cover in claim 1 wherein said cover is adapted to be welded to a disk drive chassis.

4. The cover in claim 3 wherein said cover is adapted to be spot welded.

5. The cover in claim 3 wherein said cover is adapted to be seam welded.

6. The cover in claim 3 wherein said cover is adapted to be laser welded.

7. The cover in claim 1 further comprising:

at least one biasing member adapted to abuttingly bias a cartridge.

8. The cover of claim 7 wherein said at least one biasing member is integrally formed with the cover.

9. The cover in claim 3 wherein said cover further defines at least one well adapted to mate with a bend hole formed in a chassis to prevent a cartridge from jamming in said bend hole.

* * * * *